US011258914B2

(12) United States Patent
Shimizu et al.

(10) Patent No.: US 11,258,914 B2
(45) Date of Patent: Feb. 22, 2022

(54) INFORMATION PROCESSING APPARATUS, RECORDING APPARATUS, DETERMINATION METHOD OF PRINTING MEDIUM, AND STORAGE MEDIUM

(71) Applicant: CANON KABUSHIKI KAISHA, Tokyo (JP)

(72) Inventors: Anna Shimizu, Tokyo (JP); Yuki Igarashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 16/842,534

(22) Filed: Apr. 7, 2020

(65) Prior Publication Data
US 2020/0344371 A1 Oct. 29, 2020

(30) Foreign Application Priority Data

Apr. 24, 2019 (JP) .............................. JP2019-083124

(51) Int. Cl.
H04N 1/00 (2006.01)
(52) U.S. Cl.
CPC ..... H04N 1/00779 (2013.01); H04N 1/00618 (2013.01); H04N 1/00652 (2013.01)
(58) Field of Classification Search
None
See application file for complete search history.

(56) References Cited

U.S. PATENT DOCUMENTS

| 5,353,052 | A | * | 10/1994 | Suzuki | B41J 2/16588 347/19 |
| 5,398,305 | A | * | 3/1995 | Yawata | B41J 11/48 358/1.1 |
| 6,000,776 | A | * | 12/1999 | Suzuki | B41J 2/2139 347/14 |
| 6,035,308 | A | * | 3/2000 | Yano | G06F 16/93 715/201 |
| 6,304,278 | B1 | * | 10/2001 | Coleman | B41J 29/393 347/110 |

(Continued)

FOREIGN PATENT DOCUMENTS

JP 2016-215591 A 12/2016

Primary Examiner — Anh-Vinh Thi Nguyen
(74) Attorney, Agent, or Firm — Canon U.S.A., Inc. I.P. Division

(57) ABSTRACT

An information processing apparatus includes an acquisition unit, notification control unit, input unit, and extension unit. The acquisition unit acquires a measurement result obtained by measuring a printing medium characteristic and acquires a characteristic reference range of each of printing media types set in advance to identify a type of a measured printing medium. Extracting, as a candidate printing medium and based on the acquired measurement result and the acquired characteristic reference range, a type of printing medium using the characteristic reference range including the measurement result and notifying information indicating the type of the candidate printing medium are performed. The input unit inputs information, wherein a type of printing medium on which recording is to be performed by the recording unit has a first reference range which is the characteristic reference range of the type and corresponds to the input information. The extension unit extends the first reference range.

21 Claims, 18 Drawing Sheets

(56) References Cited

U.S. PATENT DOCUMENTS

| | | | | |
|---|---|---|---|---|
| 6,315,470 B1* | 11/2001 | Vaghi | ............... | B41J 3/36 |
| | | | | 400/103 |
| 6,511,148 B1* | 1/2003 | Colombi | ............. | B41J 11/009 |
| | | | | 347/14 |
| 6,567,187 B1* | 5/2003 | Iwasaki | ............. | B41J 11/0095 |
| | | | | 271/153 |
| 2003/0137680 A1* | 7/2003 | Maruoka | ............ | H04N 1/00965 |
| | | | | 358/1.13 |
| 2004/0008884 A1* | 1/2004 | Simske | ............. | H04N 1/4095 |
| | | | | 382/165 |
| 2005/0154562 A1* | 7/2005 | Matsuura | ........... | G06F 11/008 |
| | | | | 702/185 |
| 2005/0262394 A1* | 11/2005 | Yasukawa | .......... | G06F 11/0733 |
| | | | | 714/23 |
| 2006/0033262 A1* | 2/2006 | Stemmle | ............. | B65H 9/04 |
| | | | | 271/258.01 |
| 2007/0091132 A1* | 4/2007 | Lim | ................ | B41J 11/0095 |
| | | | | 347/14 |
| 2009/0080949 A1* | 3/2009 | Yamanobe | .............. | B41J 2/01 |
| | | | | 399/308 |
| 2010/0025450 A1* | 2/2010 | Nakamaki | ........... | B41J 11/0025 |
| | | | | 226/1 |
| 2010/0111550 A1* | 5/2010 | Kubo | ............... | G03G 15/0216 |
| | | | | 399/50 |
| 2010/0310264 A1* | 12/2010 | Ishida | ............. | G03G 15/5029 |
| | | | | 399/45 |
| 2012/0206756 A1* | 8/2012 | Nakashio | ............ | H04N 1/4092 |
| | | | | 358/1.14 |
| 2015/0002862 A1* | 1/2015 | Maeda | ............... | B41J 11/008 |
| | | | | 358/1.2 |
| 2016/0026140 A1* | 1/2016 | Oomoto | ............ | G03G 15/6529 |
| | | | | 399/323 |

* cited by examiner

FIG.7A

|  |  | STANDARD GLOSSY PAPER | STANDARD HALF GLOSSY PAPER | PREMIUM GLOSSY PAPER | THICK GLOSSY PAPER | STANDARD PLAIN PAPER | PREMIUM PLAIN PAPER |
|---|---|---|---|---|---|---|---|
| SPECULAR REFLECTION VALUE | min | 95 | 94 | 100 | 95 | 85 | 90 |
|  | middle | 100 | 99 | 105 | 100 | 90 | 95 |
|  | max | 105 | 104 | 110 | 105 | 95 | 100 |
| DIFFUSED REFLECTION VALUE | min | 95 | 90 | 110 | 95 | 70 | 78 |
|  | middle | 100 | 95 | 115 | 100 | 75 | 83 |
|  | max | 105 | 100 | 120 | 105 | 80 | 88 |
| PAPER THICKNESS | min | 140 | 140 | 160 | 220 | 45 | 60 |
|  | middle | 190 | 190 | 210 | 270 | 95 | 110 |
|  | max | 240 | 240 | 260 | 320 | 146 | 160 |

FIG.7B

|  |  | STANDARD GLOSSY PAPER | STANDARD HALF GLOSSY PAPER | PREMIUM GLOSSY PAPER | THICK GLOSSY PAPER | STANDARD PLAIN PAPER | PREMIUM PLAIN PAPER |
|---|---|---|---|---|---|---|---|
| SPECULAR REFLECTION VALUE | min | 95 | 95 | 100 | 95 | 85 | 90 |
|  | middle | 100 | 100 | 105 | 100 | 90 | 95 |
|  | max | 105 | 105 | 110 | 105 | 95 | 100 |
| DIFFUSED REFLECTION VALUE | min | 95 | 91 | 110 | 95 | 70 | 78 |
|  | middle | 100 | 96 | 115 | 100 | 75 | 83 |
|  | max | 105 | 101 | 120 | 105 | 80 | 88 |
| PAPER THICKNESS | min | 140 | 149 | 160 | 220 | 45 | 60 |
|  | middle | 190 | 199 | 210 | 270 | 95 | 110 |
|  | max | 240 | 249 | 260 | 320 | 146 | 160 |

FIG.9

| | |
|---|---|
| SPECULAR REFLECTION VALUE | 103 |
| DIFFUSED REFLECTION VALUE | 98 |
| PAPER THICKNESS | 225 |

FIG.10

| | STANDARD GLOSSY PAPER | STANDARD HALF GLOSSY PAPER | PREMIUM GLOSSY PAPER | THICK GLOSSY PAPER | STANDARD PLAIN PAPER | PREMIUM PLAIN PAPER |
|---|---|---|---|---|---|---|
| PAPER THICKNESS | ○ | ○ | ○ | ○ | × | × |
| DIFFUSED REFLECTION VALUE | ○ | ○ | × | ○ | NO DETERMINATION | NO DETERMINATION |
| SPECULAR REFLECTION VALUE | ○ | ○ | NO DETERMINATION | ○ | NO DETERMINATION | NO DETERMINATION |

FIG.11A

| | STANDARD GLOSSY PAPER | STANDARD HALF GLOSSY PAPER | PREMIUM GLOSSY PAPER | THICK GLOSSY PAPER | STANDARD PLAIN PAPER | PREMIUM PLAIN PAPER |
|---|---|---|---|---|---|---|
| SPECULAR REFLECTION VALUE | 0.6 | 0.8 | N/A | 0.6 | N/A | N/A |
| DIFFUSED REFLECTION VALUE | 0.4 | 0.6 | N/A | 0.4 | N/A | N/A |
| PAPER THICKNESS | 0.7 | 0.7 | N/A | 0.9 | N/A | N/A |
| TOTAL | 1.7 | 2.1 | | 1.9 | | |
| RANK ORDER | 1 | 3 | | 2 | | |

FIG.11B

| | STANDARD GLOSSY PAPER | STANDARD HALF GLOSSY PAPER | PREMIUM GLOSSY PAPER | THICK GLOSSY PAPER | STANDARD PLAIN PAPER | PREMIUM PLAIN PAPER |
|---|---|---|---|---|---|---|
| SPECULAR REFLECTION VALUE | 0.6 | 0.4 | N/A | 0.6 | N/A | N/A |
| DIFFUSED REFLECTION VALUE | 0.4 | 0.6 | N/A | 0.4 | N/A | N/A |
| PAPER THICKNESS | 0.7 | 0.52 | N/A | 0.9 | N/A | N/A |
| TOTAL | 1.7 | 1.52 | | 1.9 | | |
| RANK ORDER | 2 | 1 | | 3 | | |

FIG.12A

| | | STANDARD HALF GLOSSY PAPER |
|---|---|---|
| SPECULAR REFLECTION VALUE | LATEST MEASURED VALUE | 99 |
| | SECOND LATEST MEASURED VALUE | 99 |
| | THIRD LATEST MEASURED VALUE | 99 |
| | CHARACTERISTIC VALUE (AVERAGE VALUE) | 99 |

FIG.12B

| | | STANDARD HALF GLOSSY PAPER |
|---|---|---|
| SPECULAR REFLECTION VALUE | LATEST MEASURED VALUE | 103 |
| | SECOND LATEST MEASURED VALUE | 99 |
| | THIRD LATEST MEASURED VALUE | 99 |
| | CHARACTERISTIC VALUE (AVERAGE VALUE) | 100.3 |

FIG.12C

| | | STANDARD HALF GLOSSY PAPER |
|---|---|---|
| SPECULAR REFLECTION VALUE | LATEST MEASURED VALUE | 104 |
| | SECOND LATEST MEASURED VALUE | 103 |
| | THIRD LATEST MEASURED VALUE | 99 |
| | CHARACTERISTIC VALUE (AVERAGE VALUE) | 102 |

FIG.12D

| | | STANDARD HALF GLOSSY PAPER |
|---|---|---|
| SPECULAR REFLECTION VALUE | LATEST MEASURED VALUE | 102 |
| | SECOND LATEST MEASURED VALUE | 104 |
| | THIRD LATEST MEASURED VALUE | 103 |
| | CHARACTERISTIC VALUE (AVERAGE VALUE) | 103 |

FIG.14

| ORDER OF HISTORY | |
|---|---|
| 1 | PREMIUM PLAIN PAPER |
| 2 | STANDARD HALF GLOSSY PAPER |
| 3 | PREMIUM GLOSSY PAPER |
| 4 | THICK GLOSSY PAPER |
| 5 | STANDARD GLOSSY PAPER |
| 6 | STANDARD PLAIN PAPER |

FIG.17A

| ORDER OF HISTORY | |
|---|---|
| 1 | STANDARD HALF GLOSSY PAPER |
| 2 | PREMIUM PLAIN PAPER |
| 3 | PREMIUM PLAIN PAPER |
| 4 | STANDARD HALF GLOSSY PAPER |
| 5 | PREMIUM PLAIN PAPER |
| 6 | THICK GLOSSY PAPER |

FIG.17B

| ORDER OF HISTORY | |
|---|---|
| 1 | STANDARD GLOSSY PAPER |
| 2 | STANDARD HALF GLOSSY PAPER |
| 3 | PREMIUM PLAIN PAPER |
| 4 | PREMIUM PLAIN PAPER |
| 5 | STANDARD HALF GLOSSY PAPER |
| 6 | PREMIUM PLAIN PAPER |

FIG.18A

| | | STANDARD GLOSSY PAPER | STANDARD HALF GLOSSY PAPER | PREMIUM GLOSSY PAPER | THICK GLOSSY PAPER | STANDARD PLAIN PAPER | PREMIUM PLAIN PAPER |
|---|---|---|---|---|---|---|---|
| SPECULAR REFLECTION VALUE | min | 95 | 91.8 | 100 | 94 | 85 | 86.36 |
| | middle | 100 | 99 | 105 | 100 | 90 | 95 |
| | max | 105 | 106.2 | 110 | 106 | 95 | 103.64 |
| DIFFUSED REFLECTION VALUE | min | 95 | 87.8 | 110 | 94 | 70 | 74.36 |
| | middle | 100 | 95 | 115 | 100 | 75 | 83 |
| | max | 105 | 102.2 | 120 | 106 | 80 | 91.64 |
| PAPER THICKNESS | min | 140 | 118 | 160 | 210 | 45 | 23.6 |
| | middle | 190 | 190 | 210 | 270 | 95 | 110 |
| | max | 240 | 262 | 260 | 310 | 146 | 196.4 |

FIG.18B

| | | STANDARD GLOSSY PAPER | STANDARD HALF GLOSSY PAPER | PREMIUM GLOSSY PAPER | THICK GLOSSY PAPER | STANDARD PLAIN PAPER | PREMIUM PLAIN PAPER |
|---|---|---|---|---|---|---|---|
| SPECULAR REFLECTION VALUE | min | 94 | 91.8 | 100 | 95 | 85 | 86.36 |
| | middle | 100 | 99 | 105 | 100 | 90 | 95 |
| | max | 106 | 106.2 | 110 | 105 | 95 | 103.64 |
| DIFFUSED REFLECTION VALUE | min | 94 | 87.8 | 110 | 95 | 70 | 74.36 |
| | middle | 100 | 95 | 115 | 100 | 75 | 83 |
| | max | 106 | 102.2 | 120 | 105 | 80 | 91.64 |
| PAPER THICKNESS | min | 130 | 118 | 160 | 220 | 45 | 23.6 |
| | middle | 190 | 190 | 210 | 270 | 95 | 110 |
| | max | 250 | 262 | 260 | 320 | 146 | 196.4 |

INFORMATION PROCESSING APPARATUS, RECORDING APPARATUS, DETERMINATION METHOD OF PRINTING MEDIUM, AND STORAGE MEDIUM

BACKGROUND

Field

The present disclosure relates to an information processing apparatus, a recording apparatus, a determination method of a printing medium, and a storage medium.

Description of the Related Art

A recording apparatus has been known which performs recording using a control parameter suitable for the type of a printing medium. Japanese Patent Application Laid-Open No. 2016-215591 discusses a method of measuring a plurality of characteristic values of a recording target printing medium and identifying the type of the printing medium by comparing the measured characteristic values with reference values, for performing recording using an appropriate control parameter.

Nevertheless, an accident error of a sensor that measures characteristic values of the printing medium, an individual difference of the printing medium, and a difference in measurement environment affect measured values. Thus, if the printing medium is identified using the same reference prepared in advance, the identification result can possibly be useless for a user.

SUMMARY

The present disclosure is directed to enhancing the usability for the user.

According to an aspect of the present disclosure, an information processing apparatus includes an acquisition unit configured to acquire a measurement result obtained by measuring a characteristic of a printing medium on which recording is to be performed by a recording unit, and to acquire a characteristic reference range of each of types of printing media set in advance to identify a type of a measured printing medium, a notification control unit configured to perform control to extract, as a candidate printing medium and based on the acquired measurement result and the acquired characteristic reference range, a type of printing medium using the characteristic reference range including the measurement result and to perform control to cause a notification unit to notify information indicating the type of the candidate printing medium, an input unit configured to input information, wherein a type of printing medium on which recording is to be performed by the recording unit has a first reference range which is the characteristic reference range of the type and corresponds to the information input by the input unit, and an extension unit configured to extend the first reference range.

Further features of the present disclosure will become apparent from the following description of exemplary embodiments with reference to the attached drawings.

BRIEF DESCRIPTION OF THE DRAWINGS

FIGS. 7A and 7B illustrate tables indicating characteristic values stored in an electrically erasable programmable read-only memory (EEPROM) according to an exemplary embodiment.

FIG. 9 illustrates a table indicating an example of measured values according to an exemplary embodiment.

FIG. 10 illustrates a table indicating a determination result in printing medium determination processing according to an exemplary embodiment.

FIGS. 11A and 11B illustrate tables indicating ranking according to an exemplary embodiment.

FIGS. 12A, 12B, 12C, and 12D illustrate tables for describing a method of calculating a characteristic value according to an exemplary embodiment.

FIG. 14 illustrates a table indicating history information according to an exemplary embodiment.

FIGS. 17A and 17B illustrate tables indicating history information according to an exemplary embodiment.

FIGS. 18A and 18B illustrate tables indicating characteristic values stored in an EEPROM according to an exemplary embodiment.

DESCRIPTION OF THE EMBODIMENTS

<Overall Configuration>

Figure 1A:
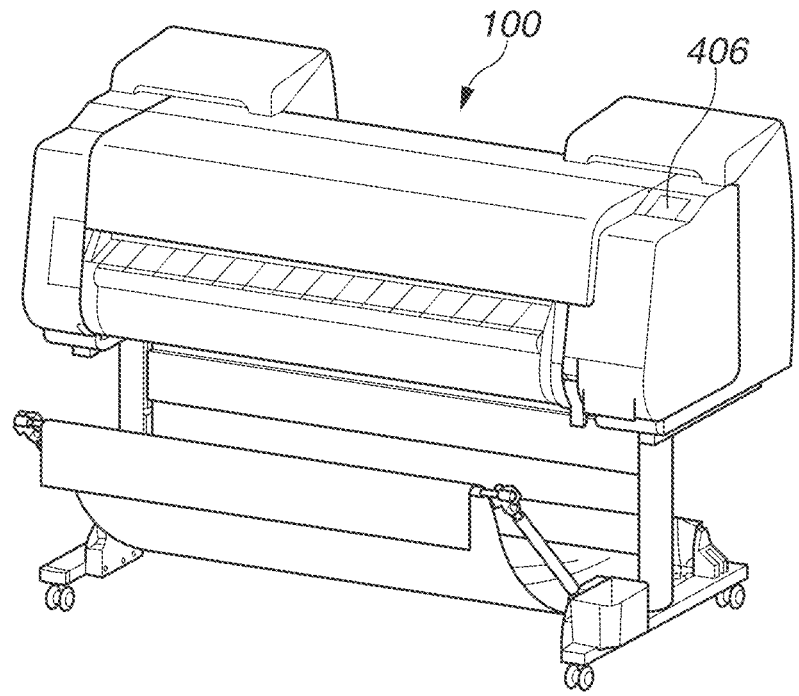
FIGS. 1A and 1B are diagrams illustrating a configuration of a recording apparatus according to an exemplary embodiment.
Figure 1B:
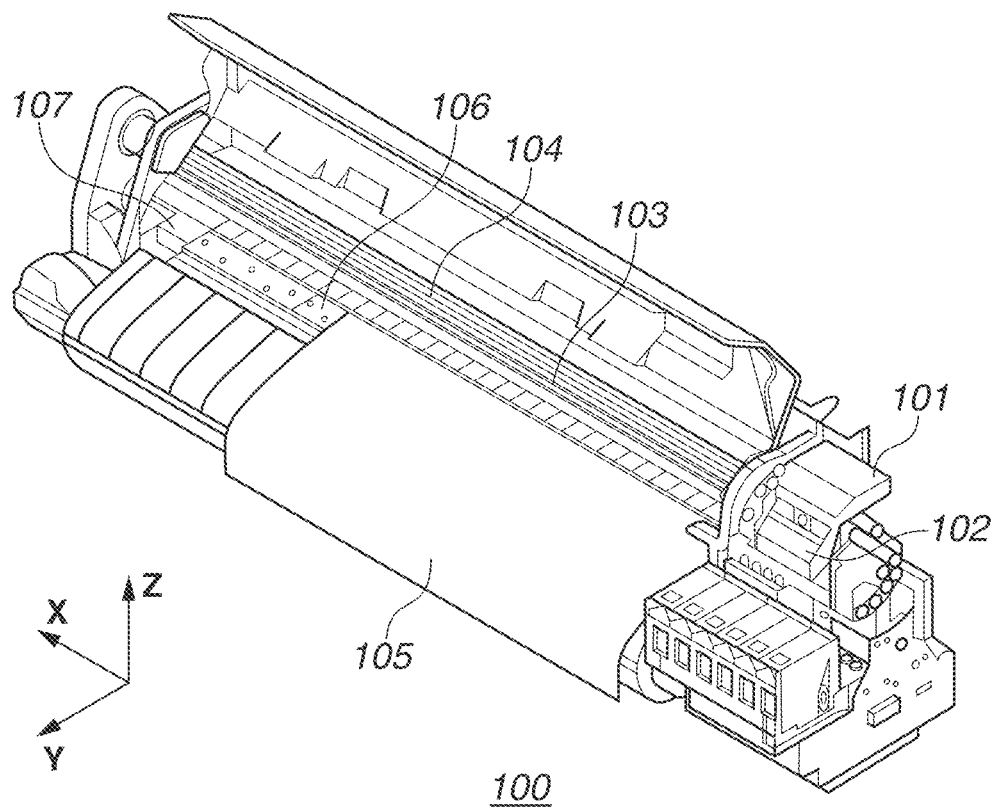

FIGS. 1A and 1B are perspective views illustrating a configuration of a recording apparatus 100, and the recording apparatus 100 is provided with casters and a basket for paper discharge. FIG. 1A illustrates an overall external view and FIG. 1B illustrates a state in which an upper cover is opened and an internal structure is visible. The recording apparatus 100 according to the present exemplary embodiment performs recording by applying ink droplets as recording material onto a printing medium, using an inkjet recording method. The printing medium is conveyed in a Y direction as a conveyance direction. An inkjet recording apparatus including a so-called serial type recording head will be described. In the inkjet recording apparatus, a carriage 101 equipped with a recording head 102 performs recording while reciprocating in an X direction intersecting with the Y direction. Nevertheless, an inkjet recording apparatus including a so-called line type recording head in which a nozzle array is arranged over a recording width with respect to the conveyance direction of a printing medium may be used. Alternatively, a multifunction peripheral (MFP) integrally including not only a recording function but also a scan function, a FAX function, and a transmission function may be used. Alternatively, an electrophotographic recording apparatus that uses powder toner as the recording material may be used. In the present exemplary embodiment, the recording apparatus 100 has a function of an information processing apparatus for performing determination processing of a printing medium to be used, which will be described below.

An input-output unit 406 is provided on an upper part of the recording apparatus 100. The input-output unit 406 is an operation panel, and displays an ink remaining amount and candidates of types of printing media on a display. By operating keys, the user can select the type of a printing medium and perform the setting of recording.

The carriage 101 includes an optical sensor 201 (FIG. 2) and the recording head 102 on which a discharge port surface provided with a discharge port for discharging ink is formed. By the driving of a carriage (CR) motor 415 (FIG. 4), the carriage 101 can reciprocate in the X direction (moving direction of the carriage) along a shaft 104 via a carriage belt 103. In the present exemplary embodiment, the recording apparatus 100 can acquire a diffused reflection characteristic value and a specular reflection characteristic value of the surface of a printing medium 105, and measure a distance between the carriage 101 and the printing medium 105, via the optical sensor 201.

The printing medium 105 such as rolled paper is conveyed in the Y direction on a platen 106 by a conveyance roller (not illustrated). A recording operation is performed by the carriage 101 discharging ink droplets from the recording head 102 while moving in the X direction on the printing medium 105 conveyed onto the platen 106 by the conveyance roller. If the carriage 101 moves to the end of a recording region on the printing medium 105, the conveyance roller conveys the printing medium 105 by a constant amount, and moves the printing medium 105 to a position at which the recording head 102 can perform recording onto a region in which the next recording scanning is to be performed. The recording of an image is performed by the repetition of the above-described operations.

<Carriage Configuration>

Figure 2:
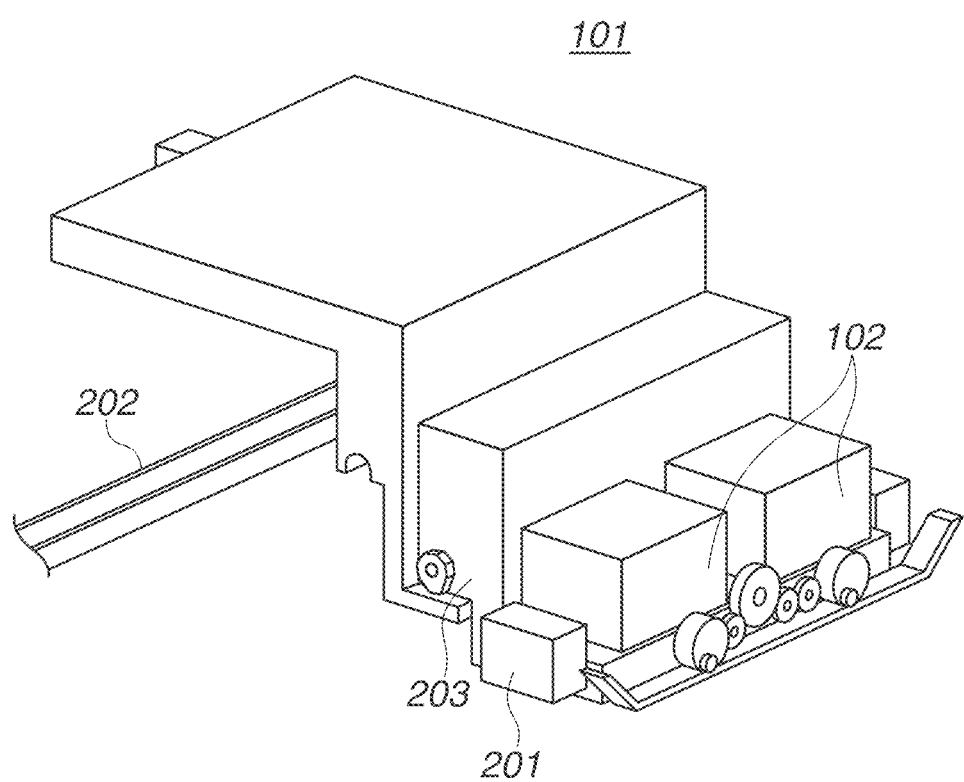
FIG. 2 is a diagram illustrating a configuration of a carriage according to an exemplary embodiment.

FIG. 2 is a diagram illustrating a configuration of the carriage 101. The carriage 101 includes a translator 202 and a head holder 203. The head holder 203 includes the recording head 102 and the optical sensor 201 being a reflective sensor. As illustrated in FIG. 2, the optical sensor 201 has a bottom surface located at the same position as a bottom surface of the recording head 102 or at a higher position than the bottom surface of the recording head 102.

<Optical Sensor Configuration>

Figure 3:
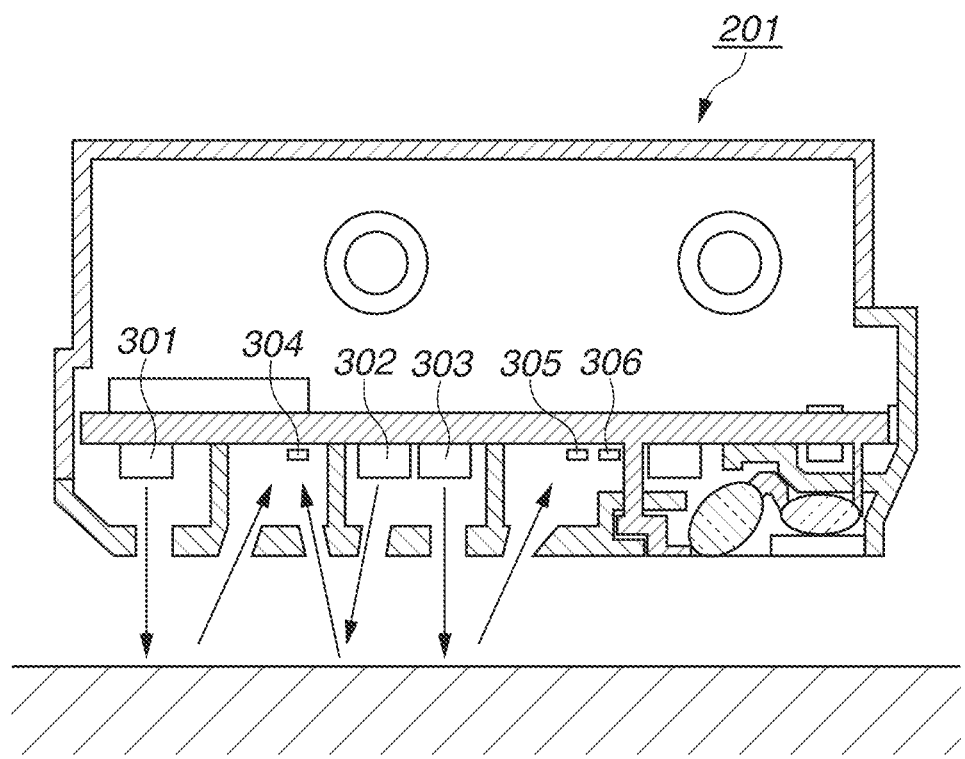
FIG. 3 is a diagram illustrating a configuration of an optical sensor according to an exemplary embodiment.

FIG. 3 is a cross-sectional schematic diagram illustrating a configuration of the optical sensor 201. The optical sensor 201 includes, as optical elements, a first LED 301, a second LED 302, and a third LED 303, as well as a first photodiode 304, a second photodiode 305, and a third photodiode 306. The first LED 301 is a light source having an emission angle of a normal line (90°) with respect to the surface (measuring surface) of the printing medium 105. The first photodiode 304 receives light that has been emitted from the first LED 301 and reflected from the printing medium 105, at an angle of Z direction 45°. In other words, an optical system that detects a so-called diffused reflection component of reflected light from the printing medium 105 is formed.

The second LED 302 is a light source having an emission angle of Z direction 60° with respect to the surface (measuring surface) of the printing medium 105. The first photodiode 304 receives light that has been emitted from the second LED 302 and reflected from the printing medium 105, at an angle of Z direction 60°. In other words, an optical system that detects a so-called specular reflection component of reflected light from the printing medium 105 is formed because a light emission angle and a light reception angle become equal.

The third LED 303 is a light source having an emission angle of a normal line (90°) with respect to the surface (measuring surface) of the printing medium 105. The second photodiode 305 and the third photodiode 306 receive light that has been emitted from the third LED 303 and reflected from the printing medium 105. The second photodiode 305 and the third photodiode 306 measure a distance between the optical sensor 201 and the printing medium 105 based on their respective light reception amounts varying in accordance with a distance between the optical sensor 201 and the printing medium 105.

In the present exemplary embodiment, the optical sensor is installed on the carriage, but another configuration may be employed. For example, an optical sensor may be fixedly installed on a recording apparatus. Alternatively, an optical sensor may be a measuring device for measuring characteristic values such as a diffused reflection value and a specular reflection value of a printing medium that is separated from a recording apparatus, and characteristic values measured by the measuring device may be transmitted to the recording apparatus.

<Block Diagram>

Figure 4:
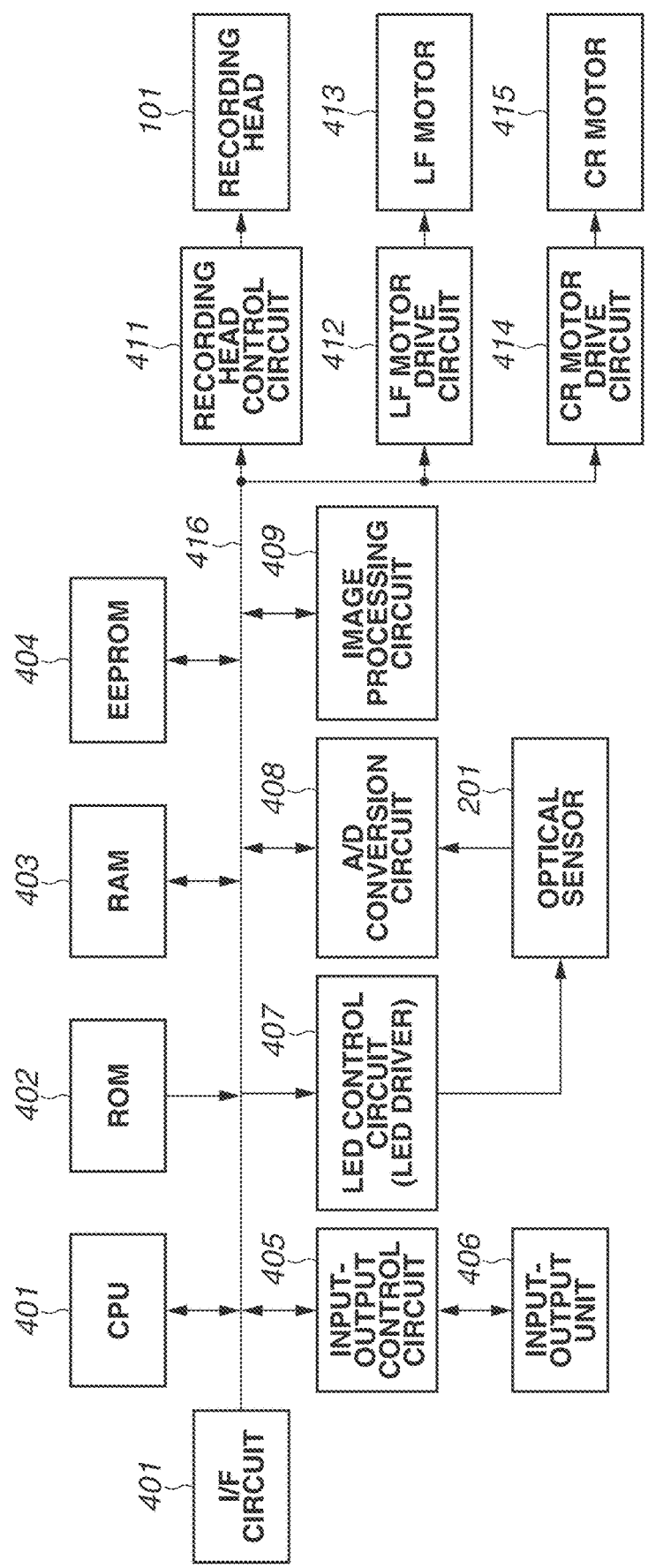
FIG. 4 is a diagram illustrating a block configuration of a control system of a recording apparatus according to an exemplary embodiment.

FIG. 4 is a diagram illustrating a block configuration of a control system of the recording apparatus 100. A read-only memory (ROM) 402 is a nonvolatile memory and stores, for example, a control program for controlling the recording apparatus 100 and programs for implementing operations of the present exemplary embodiment. The operations of the present exemplary embodiment are implemented by a central processing unit (CPU) 401 loading programs stored in the ROM 402, onto a random access memory (RAM) 403 and executing the programs, for example. The RAM 403 is also used as a working memory of the CPU 401. An electrically erasable programmable read-only memory (EEPROM) 404 stores data to be held even if the power of the recording apparatus 100 is turned off. At least the CPU 401 and the ROM 402 implement the function of the information processing apparatus for performing printing medium determination processing to be described below. The EEPROM 404 also stores characteristic values of each printing medium that are to be used as predefined references, and categories of printing media. The category refers to broad classification of the types of printing media. In the present exemplary embodiment, five categories including glossy paper, plain paper, coated paper, photo paper, and special are set. For example, if a printing medium is standard glossy paper, the printing medium is classified into the category of glossy paper, and if a printing medium is premium plain paper, the printing medium is classified into the category of plain paper. A printing medium includes a medium that is not a paper medium, but in the present exemplary embodiment, notification is performed to the user using a word "sheet". Characteristic values of each printing medium may be stored not into a storage medium in the recording apparatus but into an external memory such as a ROM of a host computer or a server.

An interface (I/F) circuit 410 connects the recording apparatus 100 and a network such as an external local area network (LAN). The recording apparatus 100 performs, via the I/F circuit 410, transmission and reception of various types of jobs and data with an apparatus such as an external host computer.

The input-output unit 406 includes an input unit and an output unit. The input unit receives a power input instruction, a recording execution instruction, and instructions of the setting of various functions from the user. The output unit displays various types of apparatus information such as a power saving mode, and a setting screen of various functions executable by the recording apparatus 100. In the present exemplary embodiment, the input-output unit 406 is an operation panel provided on the recording apparatus 100, and the input-output unit 406 is connected with a system bus 416 via an input-output control circuit 405 in such a manner that data can be transmitted and received. In the present exemplary embodiment, the CPU 401 performs information notification control of the output unit.

Alternatively, the input unit may be a keyboard of an external host computer, and may be able to receive an instruction of the user from the external host computer. The output unit may be a light-emitting diode (LED) display, a liquid crystal display (LCD) display, or a display connected with a host apparatus. When the input-output unit 406 is a touch panel, the input-output unit 406 can receive an instruction from the user via software keys. Alternatively, the input-output unit 406 may include a speaker and a microphone, and may receive an input from the user as a voice input and output a notification to the user as a voice output.

An information processing apparatus that includes a CPU and a ROM having similar functions to the CPU 401 and the ROM 402, and is externally connected with the recording apparatus 100 may perform the printing medium determination processing to be described below, and determine a printing medium to be used in the recording apparatus 100.

In the case of executing measurement using the optical sensor 201, an LED control circuit 407 is driven by the CPU 401 and a predetermined LED in the optical sensor 201 is controlled to light up. Each photodiode of the optical sensor 201 outputs a signal corresponding to received light, and the output signal is converted into a digital signal by an analog-to-digital (A/D) conversion circuit 408 and is temporarily stored into the RAM 403. Data to be held even when the power of the recording apparatus 100 is turned off is stored into the EEPROM 404.

A recording head control circuit 411 controls a recording operation of the recording head 102 such as a driving order of nozzles, by supplying a drive signal corresponding to recording data, to a nozzle drive circuit that is provided in the recording head 102 and includes a selector and a switch. For example, if recording target data is transmitted from the outside to the I/F circuit 410, the recording target data is temporarily stored into the RAM 403. Then, the recording head control circuit 411 drives the recording head 102 based on recording data obtained by converting the recording target data into recording data for recording. At this time, a line feed (LF) motor drive circuit 412 drives an LF motor 413 based on a bandwidth of the recording data, and conveys a printing medium by the rotation of a conveyance roller connected with the LF motor 413. A carriage (CR) motor drive circuit 414 causes the carriage 101 to scan via the carriage belt 103 by driving the CR motor 415.

Data transmitted from the I/F circuit 410 includes not only recording target data but also data of items set by a printer driver. Recording target data is sometimes received from the outside via the I/F circuit 410 and stored into a storage unit, or prestored in a storage unit such as a hard disk, for example. The CPU 401 reads image data from a storage unit and controls an image processing circuit 409 to execute conversion into recording data for using the recording head 102 (binarization processing). The image processing circuit 409 executes various types of image processing such as color space conversion, gamma correction, and rotation of an image, in addition to the binarization processing.

<Overall Flow>

Figure 5:
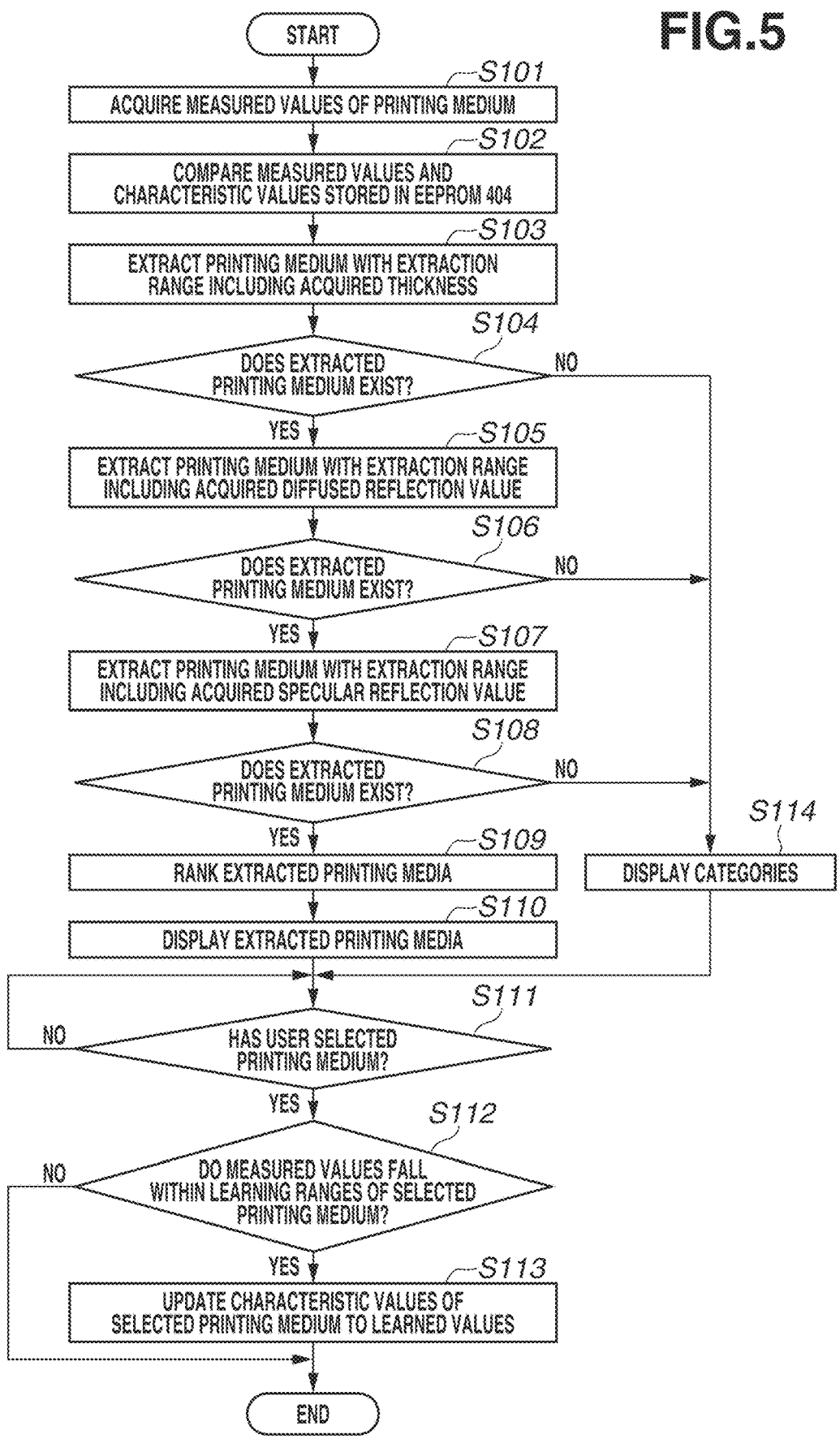
FIG. 5 is a flowchart illustrating printing medium determination processing according to an exemplary embodiment.

FIG. 5 is a flowchart illustrating printing medium determination processing of acquiring a measurement result obtained by measuring characteristics of a recording target printing medium 105, notifying candidates of the printing medium to the input-output unit 406 based on the measurement result and reference characteristic values, and determining the type of the recording target printing medium. In the following printing medium determination processing, with respect to characteristic values of the type of printing medium selected by the user, measured values are obtained as new information, and predefined characteristic values are changed so as to get close to the measured values based on the obtained information. By such learning, characteristic values that enable more accurate selection of the type of printing medium are acquired.

Processing performed in steps S101 to S114 in FIG. 5 is implemented by the CPU 401 illustrated in FIG. 4 loading programs stored in the ROM 402, onto the RAM 403 and executing the programs, for example. In addition, the printing medium determination processing may be executed by software of a host apparatus. In the present exemplary embodiment, because the input-output unit 406 is an operation panel provided on the recording apparatus, the notification of candidates of the printing medium is performed by displaying names of printing media on the operation panel. The input-output unit 406 may include a display connected to a host apparatus and the host apparatus. When the input-output unit 406 includes a speaker having a microphone function that can input and output voice, the notification of candidates of the printing medium is performed by the speaker, and the selection of a printing medium is performed by the user inputting, by voice, a name or a corresponding code of a printing medium to a microphone.

Figure 6A:
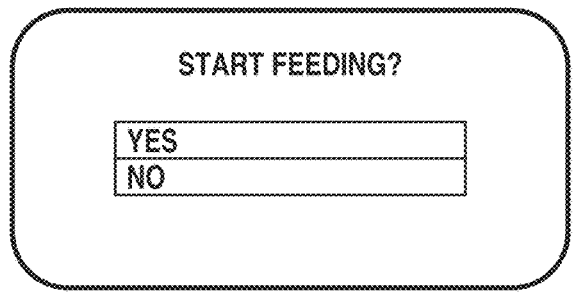
FIGS. 6A, 6B, 6C, 6D, and 6E are diagrams illustrating a display configuration of an input-output unit according to an exemplary embodiment.

If the CPU 401 receives a feeding start instruction issued by the user, from the operation panel being the input-output unit 406, the CPU 401 executes feeding processing of the printing medium 105. FIG. 6A illustrates a display example of the operation panel for receiving an input of a feeding processing start instruction. The operation panel is a touch panel into which a touch input is possible by the user. If the user touches an item of "YES", feeding is started.

If the item of "YES" is selected on the operation panel illustrated in FIG. 6A and feeding is started, the printing medium 105 is conveyed by the conveyance roller to a position detectable by the optical sensor 201 on the platen 106. If the printing medium 105 is conveyed, the carriage 101 moves on the printing medium 105 in the X direction, and in step S101, the CPU 401 acquires, via the optical sensor 201, a diffused reflection value and a specular reflection value of the printing medium 105 and a value of the thickness of the printing medium 105 (hereinafter, referred to as a paper thickness). The diffused reflection value corresponds to a whiteness degree of a printing medium and the specular reflection value corresponds to a glossiness of a printing medium. The printing medium determination processing may be performed using a width in the X direction of the printing medium as characteristics of the printing medium. The characteristics of the printing medium may be measured at one position or an average of measurement results obtained at a plurality of positions may be calculated. The characteristics may be measured in a state in which the optical sensor 201 is stopped, or may be measured while the optical sensor 201 is moving. The measured values are temporarily stored into a memory such as the RAM 403.

Subsequently, in step S102, the CPU 401 reads the acquired measured values from the memory and compares the read measured values with characteristic values of various printing media that are predefined and stored in the EEPROM 404. By the comparison, the type of printing medium that has a higher degree of coincidence with characteristics indicated by the measured values, than a predetermined degree is extracted. More specifically, the type of printing medium is extracted as follows. FIG. 7A illustrates characteristic values of each type of printing medium that are stored in the EEPROM 404. If the current value is an initial value, the characteristic value is represented as a characteristic value=$T_0$. By comparing the value with the measured value, the type of printing medium is identified. The range of reference characteristic values is regarded as an extraction range. The extraction range is an extraction range for extracting candidates of the printing medium that are to be notified to the user. Hereinafter, the extraction range will be referred to as an extraction range. The diffused reflection value and the specular reflection value are values obtained by performing 10-bit A/D conversion of output voltage output by the optical sensor 201 by receiving light. The extraction range is a range centered on a middle value being a reference value of each characteristic value of a printing medium, and is a range from a min value to a max value. The paper thickness has an extraction range of 50 μm from a middle value. In step S103, the CPU 401 extracts a type of printing medium with an extraction range including the acquired paper thickness.

Then, in step S104, the CPU 401 determines whether the extracted type of printing medium exists.

Figure 6B:
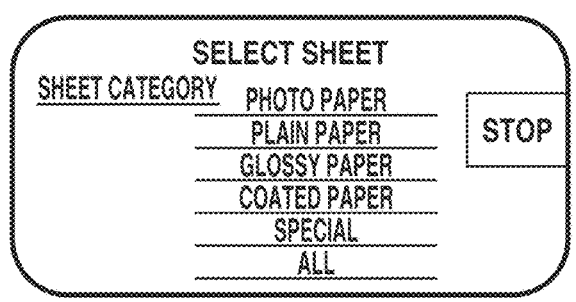
Figure 6C:
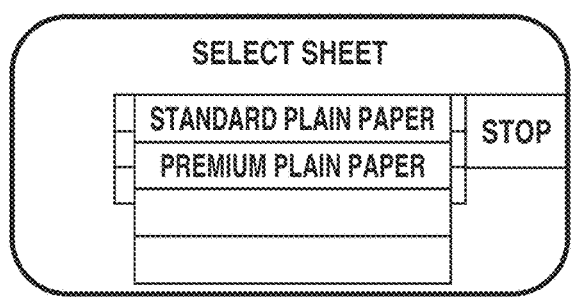

If the extracted type of printing medium does not exist (NO in step S104), the processing proceeds to step S114. In step S114, the CPU 401 displays all categories on the operation panel as illustrated in FIG. 6B. The categories are displayed in a predefined order. When the categories are displayed and an input of a category selected by the user is received, types of printing media in the selected category are displayed as illustrated in FIG. 6C. Then, an input of a type of printing medium selected from among the displayed types of printing media is received. The input is performed by touching an item in which the name of the printing medium is displayed. In FIG. 6B, an item "ALL" is displayed at the lowest part aside from the categories of printing media. If the item "ALL" is selected, all printing media are displayed in a predefined order. The printing media may be displayed in order from the recently-used (i.e., lastly-used) printing medium.

If it is determined that the extracted type of printing medium exists (YES in step S104), the processing proceeds to step S105. In step S105, the CPU 401 extracts a type of printing medium with an extraction range of diffused reflection values that is stored in the EEPROM 404 serving as a storage unit, and includes the acquired diffused reflection value. As illustrated in FIG. 7A, the extraction range of diffused reflection values is a range of ±5 from a middle value. In step S106, the CPU 401 determines whether the extracted type of printing medium exists. If it is determined that the extracted type of printing medium does not exist (NO in step S106), the processing proceeds to step S114. In step S114, the CPU 401 displays the categories on the operation panel as illustrated in FIG. 6B.

If it is determined that the extracted type of printing medium exists (YES in step S106), the processing proceeds to step S107. In step S107, the CPU 401 extracts a type of printing medium with an extraction range of specular reflection values that is stored in the EEPROM 404 serving as a storage unit, and includes the acquired specular reflection value. As illustrated in FIG. 7A, the extraction range of specular reflection values is a range of ±5 from a middle value. In step S108, the CPU 401 determines whether the extracted type of printing medium exists. If it is determined that the extracted type of printing medium does not exist (NO in step S108), the processing proceeds to step S114. In step S114, the CPU 401 displays the categories on the operation panel as illustrated in FIG. 6B.

If it is determined that the extracted type of printing medium exists (YES in step S108), the processing proceeds to step S109. In step S109, the CPU 401 ranks the extracted types of printing media in such a manner that a printing medium with characteristic values closer to the measured values has a higher priority order. The method of determining a display order will be described in detail below.

Figure 6D:
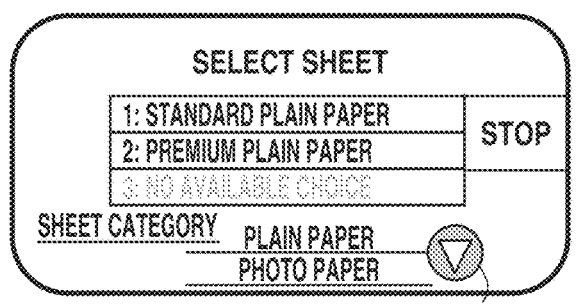

In step S110, as illustrated in FIG. 6D, the CPU 401 displays names of types of printing media in descending order of priority order determined in step S109.

By touching a button 40 displayed on the operation panel illustrated in FIG. 6D, the display of a screen can be scrolled down. If an item "STOP" is touched, the printing medium determination processing is stopped and the display switches from the display illustrated in FIG. 6A to the display of a home screen. In FIG. 6D, the names of printing media are displayed in descending order of priority with codes from 1 to 3 being allocated to the sides of the names. The type of printing medium is selected by touching an item of a displayed name of a printing medium. In this example, the priority of standard plain paper assigned the number 1 is the highest. The codes are only required to indicate the height of priority and may be codes other than numbers. In addition, a display method is not limited to this, and may be any method as long as a priority order can be recognized by the user.

In FIG. 6D, up to top three candidate printing media can be displayed, but because the extracted types of printing media are two types, only two printing media are displayed in FIG. 6D. In the field of the third printing medium, "NO AVAILABLE CHOICE" is displayed thinly (or darkly) so as to be more inconspicuous than the above-described two names of printing media, and the user is notified that there is no third candidate. For example, when the color of the background of the operation panel is black, the two printing media are displayed in while and the item "NO AVAILABLE CHOICE" is displayed in gray being a color with lower luminance than a luminance of white. Sheet categories are displayed below the display of the item "NO AVAILABLE CHOICE". In this manner, if a printing medium desired by the user is not included in printing media displayed on the input-output unit 406, individual printing media are made selectable for selecting a printing medium of another type. In the present exemplary embodiment, a category to which the first-place type of printing medium belongs is displayed at the top of categories. By displaying the category with close characteristics at the top, and making the category easily-selectable, even if a printing medium desired by the user is not included in candidate printing media, it is possible to reduce the trouble required until a category of the desired printing medium is selected.

Figure 8A:
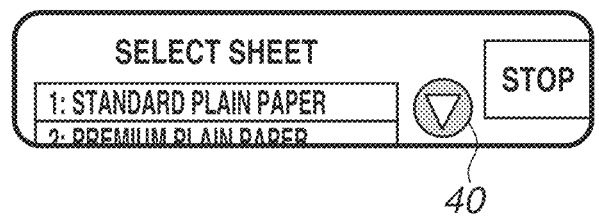
FIGS. 8A, 8B, and 8C are diagrams illustrating another configuration of an input-output unit.
Figure 8B:
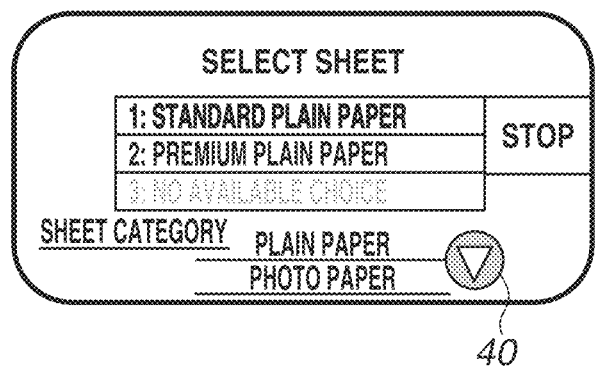
Figure 8C:
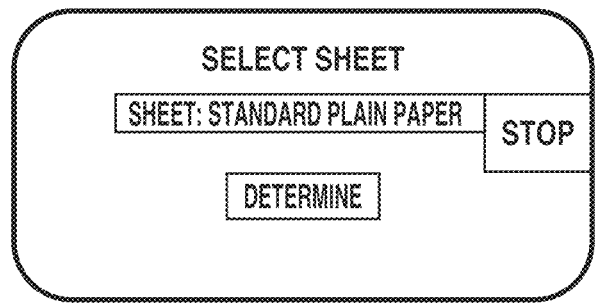

FIGS. 8A, 8B, and 8C illustrate other methods of displaying types of candidate printing media on the input-output unit 406. As illustrated in FIG. 8A, if types of candidate printing media fail to be fully displayed on the operation panel, low-order candidates may be made displayable by a scroll operation. Candidates need not be displayed in descending order of priority, and candidates are only required to be displayed in such a manner that priority orders can be recognized by the user. The name of the top printing medium may be displayed at the center of the operation panel, or the priority orders may be represented by displaying the name of printing medium with the top priority in a large font size or by boldface as illustrated in FIG. 8B. Categories are displayed below the display of "SHEET CATEGORY", but categories may be displayed without the display indicating "SHEET CATEGORY". Not categories but a type of printing medium that is other than candidates may be displayed below the candidate printing media.

As illustrated in FIG. 8C, only the top priority printing medium may be displayed. When the user desires to select another extracted printing medium, in FIG. 8C, a portion of an item of a printing medium in which standard plain paper is displayed can be selected. If the selection is received, a screen as illustrated in FIG. 6D is displayed, and other printing media become selectable. The display method may be such a display method.

If it is determined that the extracted type of printing medium does not exist (NO in step S106), the processing proceeds to step S114. In step S114, the CPU 401 displays only categories as illustrated in FIG. 6B.

In step S111, the CPU 401 determines whether the user has selected the type of printing medium on the input-output unit 406. If it is determined that the user has selected the type of printing medium on the input-output unit 406 (YES in step S111), the processing proceeds to step S112. In step S112, the CPU 401 determines whether the measured values fall within learning ranges of the selected printing medium. The learning range will now be described. If learning is performed based on measured values largely deviated from predefined characteristic values (or characteristic values changed through a learning process), wrong values are learned. Thus, a learning range being a range of measured values to be learned is set. In the present exemplary embodiment, the learning range is a range twice as large as the extraction range. The learning range is a range for changing characteristic values. If the measured values fall within the learning ranges of the selected printing medium, characteristic values are changed based on the measured values. In the present exemplary embodiment, the learning range is assumed to be a range of a predetermined value from a middle value of characteristic values, and the range is a range obtained by adding a value twice as large as a difference between the middle value and a min value and a value twice as large as a difference between the middle value and a max value. For example, an extraction range of specular reflection values of standard glossy paper that is illustrated in FIG. 7A is a range of ±5 from a middle value, and is 95 to 105. Because the learning range is a range of ±10 being twice as large as ±5 from the middle value, the learning range is 90 to 110. In a similar manner, because ranges twice as large as the extraction ranges of diffused reflection values and paper thicknesses are set, the learning range of diffused reflection values of standard glossy paper is 90 to 110, and the learning range of paper thicknesses is 90 to 290. The learning range is not limited to this. For example, the learning range may be range that is the same as the extraction range, or a different learning range may be set for each characteristic or each type of printing medium. If it is determined that the measured values fall within the learning ranges of the selected printing medium (YES in step S112), the processing proceeds to step S113. In step S113, the CPU 401 updates characteristic values of the type of printing medium selected in step S111, to values changed based on the measured values, and stores the changed values into the EEPROM 404. By the above-described processing, the printing medium determination processing ends. If it is determined that the measured values do not fall within the learning ranges (NO in step S112), the printing medium determination processing ends without updating the characteristic values of the selected type of printing medium. The update of characteristic values will be described in detail below.

If the printing medium determination processing ends and recording preparation is completed, the state shifts to a state of receiving a recording job from the user. If a recording job is received, recording is started. If the type of printing medium that has been selected and input by the user via the input-output unit 406, and the type of printing medium for a job transmitted from the host computer to the recording apparatus 100 are different, characteristic values of printing media that are stored in the EEPROM 404 may be prevented from being updated.

In the printing medium determination processing illustrated in FIG. 5, the type of printing medium having the acquired paper thickness is extracted in step S103, the type of printing medium having the acquired diffused reflection value is extracted in step S105, and the type of printing medium having the acquired specular reflection value is extracted in step S107. The extraction order is not limited to this, and the type of printing medium having the acquired diffused reflection value may be initially extracted, for example.

When the optical sensor 201 is provided in a measuring device separated from the recording apparatus, characteristics of a printing medium set in the measuring device are initially measured by measurement. Then, the acquired measured values are transmitted to the recording apparatus, a printing medium is extracted by the CPU 401 of the recording apparatus, and candidates are notified to the input-output unit 406. The notification may be performed in the above-described manner.

Hereinafter, the determination method of a display order in step S110 and the update of characteristic values in step S113 of the printing medium determination processing will be described using specific examples. The characteristic values of the printing medium that have been acquired in step S101 are (diffused reflection value, specular reflection value, paper thickness)=(103, 98, 225) as illustrated in FIG. 9. FIG. 10 illustrates a table indicating a determination result of the processing in steps S103 to S107. A circle mark "○" indicates a printing medium with an extraction range including a measured value, and a cross mark "x" indicates a printing medium with an extraction range not including a measured value. As for a printing medium with a characteristic value regarding which the measured value is not included in an extraction range, determination is not performed in the next processing. This is displayed as "NO DETERMINATION" in FIG. 10.

In step S103, standard glossy paper, standard half glossy paper, premium glossy paper, and thick glossy paper, which are the types of printing media that have extraction ranges including the acquired paper thickness of 225 as illustrated in the extraction ranges of paper thicknesses in FIG. 7A, are extracted. Because the extracted type of printing medium exists (YES in step S104), the processing proceeds to step S105.

In step S105, from among the printing media extracted in step S103, standard glossy paper, standard half glossy paper, and thick glossy paper, which are the types of printing media that have extraction ranges including the measured diffused reflection value of 98 as illustrated in the extraction ranges of diffused reflection values in FIG. 7A, are extracted. Because the extracted type of printing medium exists (YES in step S106), the processing proceeds to step S107.

In step S107, from among the printing media extracted in step S105, printing media that have extraction ranges including the measured specular reflection of 103 as illustrated in the extraction ranges of specular reflection values in FIG. 7A are extracted. In this example, standard glossy paper, standard half glossy paper, and thick glossy paper are extracted. Because the extracted type of printing medium exists (YES in step S108), the processing proceeds to step S109.

In step S109, the extracted printing media are ranked in such a manner that a printing medium with characteristic values closer to the measured values has a higher priority order. Then, in step S110, names of the extracted types of printing media are displayed in descending order of priority order.

FIGS. 11A and 11B are diagrams illustrating a determination method of ranking in step S109. In the present exemplary embodiment, a closeness between a middle value and a measured value of each characteristic is calculated by the following calculation method.

$$|(\text{measured value}-\text{middle value of characteristic})/(\text{max value of characteristic}-\text{middle value of characteristic})|$$

In this calculation, a min value may be used in place of a max value of a characteristic.

Figure 6E:
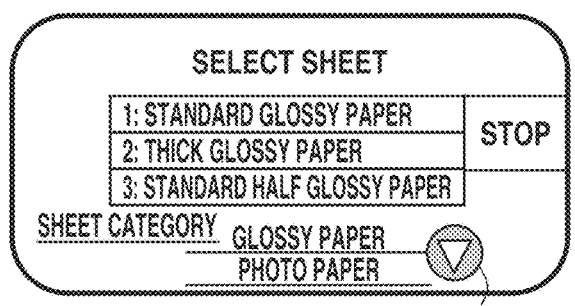

For example, calculation is performed for a specular reflection value of standard glossy paper, $|(103-100)/(105-95)|=0.6$ is obtained. In step S105, the above-described calculation is performed for the extracted type of printing medium, and closeness values to the measured values of the respective characteristics are summed up. A printing medium with a smaller total value has characteristic values closer to the measured values. A printing medium with a smaller total value is determined to be a higher rank type of printing medium, and is displayed on the input-output unit 406. In this example, as illustrated in FIG. 6E, standard glossy paper, thick glossy paper, standard half glossy paper are displayed in this order.

The processing in step S112 that is to be performed when standard half glossy paper in a third display order is selected by the user in step S111 will be described.

In step S112, it is determined whether the measured values acquired in step S101 fall within learning ranges of standard half glossy paper being the selected type of printing medium. If the measured values fall within the learning ranges of all the characteristic values of a diffused reflection value, a specular reflection value, and a paper thickness, it is determined that the measured values fall within the learning ranges of standard half glossy paper. As illustrated in FIG. 7A, the extraction range of specular reflection values of standard half glossy paper is a range of ±5 from a middle value (middle) of 99, and is 94 to 104. As described above, the learning range is a range twice as large as the extraction range from the same middle value as the extraction range. The learning range of specular reflection values of standard half glossy paper is a range of ±10 from the middle value of 99, and is 89 to 109. In a similar manner, a learning range of diffused reflection values of standard half glossy paper is 85 to 105, and a learning range of paper thicknesses is 90 to 290. Because all the measured values (diffused reflection value, specular reflection value, paper thickness)=(103, 98, 225) fall within the above-described learning ranges (YES in step S112), the processing proceeds to step S113.

In step S113, the characteristic values of the selected type of printing medium are updated based on the measured values. The characteristic values illustrated in FIG. 7A are characteristic values before update, and FIG. 9 illustrates the measured values. In the present exemplary embodiment, characteristic values of the type of printing medium are brought closer to the measured values at a constant rate. At this time, because the measured values include measurement errors, instead of directly replacing the measured values with characteristic values at one time, it is desirable that differences are gradually reduced by performing learning a plurality of times in such a manner that a difference between a measured value and a characteristic value is reduced at a constant rate. An example of this update is represented by the following generalized equation.

updated characteristic value $(Tn+1)$=(measured value $(R)$-characteristic value $(Tn))\times\alpha$+characteristic value $(Tn)$ before update In this equation, "$\alpha$" denotes a value indicating a rate at which a characteristic value is brought closer to a measured value. If the rate of bringing the characteristic value closer to the measured value is set to 25%, a middle value of a specular reflection value becomes as follows. For example, when $Tn=T_0$ (initial value), $T_1$ is obtained by the first update.

When $R=103$, $Tn=T_0=99$, $T_1$ is obtained in the following manner.

$$T_1=(103-99)\times 0.25+99=100$$

In a similar manner, characteristic values of a diffused reflection value and a paper thickness are updated. FIG. 7B illustrates an updated result. The extraction ranges of specular reflection values and diffused reflection values remain as ranges of ±5 from a middle value, the extraction range of paper thicknesses remains as a range of ±50 from a middle value, and min values and max values are also updated in accordance with the middle values. The original characteristic values are rewritten with the updated characteristic values, and the updated characteristic values are stored in the EEPROM 404 as characteristic values of standard half glossy paper and used in the subsequent printing medium determination processing. In the above-described manner, the printing medium determination processing ends.

In the above-described example, when characteristic values are updated, characteristic values are brought closer to measured values at 25%, but a rate of bringing the characteristic values closer to the measured values is not limited to this, and the rate is only required to be larger than 0% and equal to or smaller than 100%. A rate of bringing characteristic value closer to the measured values may be set for each type of printing medium, or may be set for each characteristic.

In a state in which characteristic values are updated as illustrated in FIG. 7B, standard half glossy paper having characteristic values of printing medium of (diffused reflection value, specular reflection value, paper thickness)=(103, 98, 225) is measured again. FIG. 11B illustrates a result of ranking printing media in descending order of closeness between measured values and characteristic values. By updating the characteristic values of standard half glossy paper, a rank order of standard half glossy paper becomes the first place. Thus, in step S110, standard half glossy paper, being a measured printing medium, is displayed on the input-output unit 406 as the top rank printing medium, and becomes easily selectable by the user.

In addition, as another method of reflecting measured values in characteristic values of the type of printing medium, an average value of measured values obtained in past N measurements may be set as a characteristic value. FIGS. 12A, 12B, 12C, and 12D are diagrams illustrating a method of setting a characteristic value based on measured values obtained in past three measurements. The description will now be given using specular reflection values of standard half glossy paper as an example. FIG. 12A illustrates a case where standard half glossy paper has never been selected in step S111 or S114. In FIG. 12A, 99 being an initially-set value is input as values obtained in the past three measurements, and because an average value is 99 as well, a characteristic value is set to 99. In FIG. 12B, if standard half glossy paper is selected, a measured value of 103 is input as the latest measured value. An average value of 100.3 obtained when the measured value of 103 is input is set as a characteristic value to be subsequently used. FIG. 12C illustrates a case where standard half glossy paper is further selected, and a measured value of 104 is input as the latest measured value. An average value of 102 obtained at this time is set as a characteristic value to be subsequently used. FIG. 12D illustrates a case where standard half glossy paper is further selected from the state illustrated in FIG. 12C, and a measured value of 102 is input as the latest measured value. An average value of 103 obtained at this time is set as a characteristic value to be subsequently used.

As described above, characteristic values of a fed printing medium are acquired, and the type of printing medium with characteristic values close to measured values is preferentially notified. With this configuration, a printing medium of a type that is highly likely to be selected by the user is preferentially notified, and the user's trouble of selecting a desired type of printing medium can be saved.

In the above-described printing medium determination processing, extracted types of printing media are notified in descending order of closeness between characteristic values and measured values. Hereinafter, printing medium determination processing to be performed when a notification order is determined based on history information will be described.

In this example, the EEPROM 404 stores a history of types of printing media that have been fed and selected by the user so far. The printing medium selected by the user is a printing medium selected in step S111 in the above-described printing medium determination processing illustrated in FIG. 5. The stored information is handled as history information.

Figure 13:
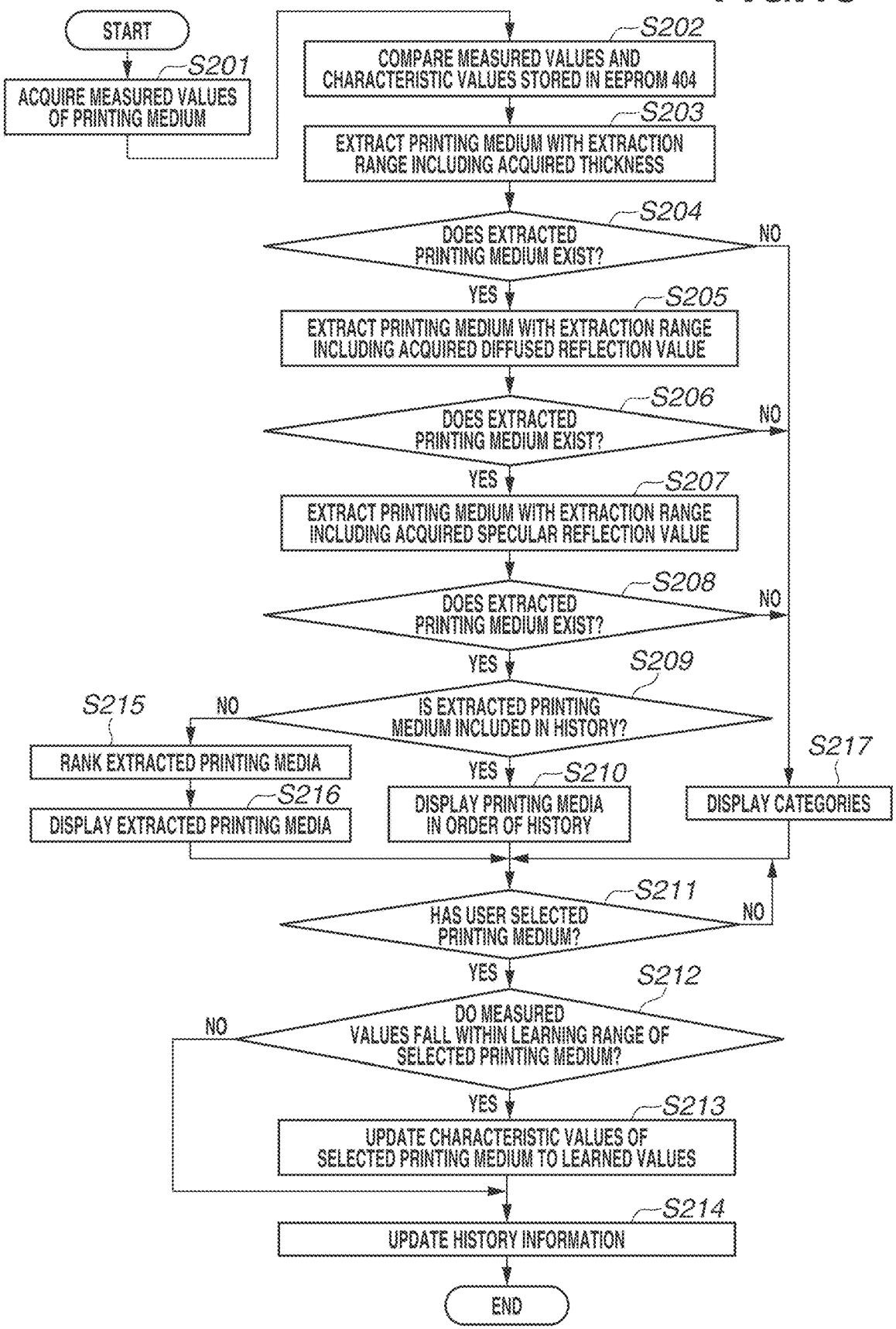
FIG. 13 is a flowchart illustrating printing medium determination processing according to an exemplary embodiment.

FIG. 13 is a flowchart illustrating printing medium determination processing that uses history information. In steps S201 to S208 and S217 in FIG. 13, processing similar to the processing in steps S101 to S108 and S114 in FIG. 5 in the first exemplary embodiment is performed.

In step S209, the CPU 401 determines whether the extracted type of printing medium is included in a use history, based on history information stored in the EEPROM 404. As illustrated in FIG. 14, printing media that have been used in the recording apparatus 100 so far are stored in the EEPROM 404 in association with information indicating closeness of a use time. If a printing medium of the same type is used a plurality of times, only lastly-used information is stored in a history. In FIG. 14, a printing medium with a small number allocated in the column of a history order is a recently-used printing medium.

If it is determined that the extracted type of printing medium is not included in the history information (NO in step S209), the processing proceeds to step S215. In step S215, similarly to step S109 in FIG. 5, the CPU 401 ranks the extracted types of printing media in such a manner that a printing medium with characteristic values closer to the measured values has a higher priority order.

In step S216, as illustrated in FIG. 6D, the CPU 401 displays the names of printing media in order on the operation panel in accordance with the priority order determined in step S215, and the processing proceeds to step S211.

Figure 15:
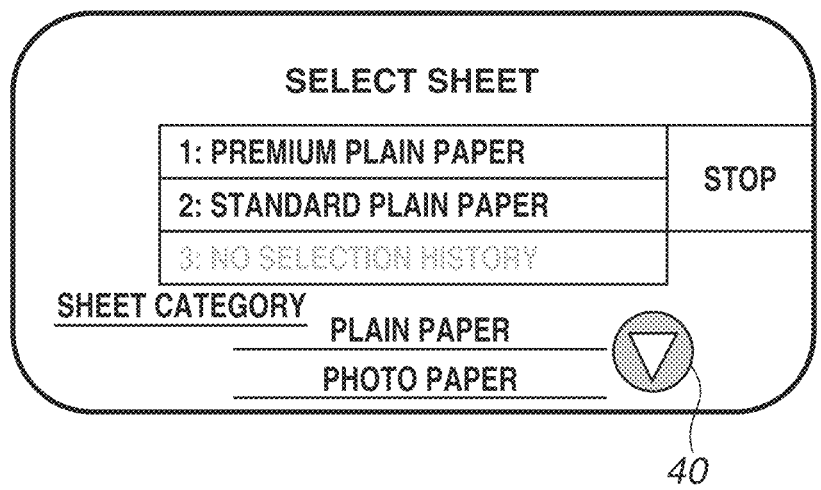
FIG. 15 is a diagram illustrating a display configuration of an input-output unit according to an exemplary embodiment.

If it is determined that the extracted type of printing medium is included in the history information (YES in step S209), the processing proceeds to step S210. In step S210, as illustrated in FIG. 15, the CPU 401 displays the extracted types of printing media with duplicative printing media of the same type grouped together into one. In FIG. 15, the names of the types of printing media that have been used so far are displayed in descending order of priority order in such a manner that a recently-used printing medium has a higher priority order. In this example, names of printing media of three types can be displayed, but only two types of printing media that have been extracted and are included in history information are displayed. In this case, information indicating no history information and saying "NO SELECTION HISTORY" is displayed in the third field.

In steps S211 to S213, processing similar to the processing in steps S111 to S113 in FIG. 5 is performed. In step S211, the CPU 401 determines whether the user has selected the type of printing medium on the input-output unit 406. If it is determined that the user has selected the type of printing medium on the input-output unit 406 (YES in step S211), the processing proceeds to step S212. In step S212, the CPU 401 determines whether the measured values fall within learning ranges of the selected printing medium. If it is determined that the measured values do not fall within the learning ranges of the selected printing medium (NO in step S212), the processing proceeds to step S214. If it is determined that the measured values fall within the learning ranges of the selected printing medium (YES in step S212), the processing proceeds to step S213. In step S213, the CPU 401 changes and updates the characteristic values of the selected printing medium based on the measured values.

Next, in step S214, the CPU 401 updates the history information to information including the selected type of printing medium as the latest use history. By the above-described processing, the printing medium determination processing ends.

If it is determined that the measured values do not fall within the learning ranges of the selected printing medium (NO in step S212), history information may be prevented from being updated in step S214.

As described above, the type of printing medium that has ever been used is notified as a high-rank candidate. With this configuration, a printing medium of a type that is highly likely to be selected by the user is preferentially notified, and the user's trouble of selecting a desired type of printing medium can be saved.

The above description has been given of a configuration in which characteristic values are changed by changing reference values of characteristic values. Hereinafter, the description will be given of a configuration in which characteristic values are changed by changing sizes of extraction ranges of characteristic values.

In the configuration to be described below, as for the type of printing medium selected to be used in the recording apparatus 100, extraction ranges of characteristic values that are stored in the EEPROM 404 are extended. The type of printing medium with extended extraction ranges becomes easily extractable in the next measurement, and easily displayable as a candidate. It is therefore possible to save the user's trouble of selecting the type of printing medium from among printing media other than candidates, when selecting the type of printing medium next. Extraction ranges of the type of printing medium selected to be used are extended, but if the extraction ranges are kept extended, when the type of printing medium is not used for a while, the type of printing medium is continuously displayed as a candidate even though the type of printing medium is not used. Thus, extraction ranges of the type of printing medium that has not been selected for a predetermined period of time are reduced.

In the present exemplary embodiment, an upper limit of an extendable extraction range and a lower limit of a reducible extraction range are set. By providing an upper limit, a characteristic value is prevented from becoming a detected value largely exceeding a characteristic value that can be taken by the type of printing medium. In addition, by providing a lower limit, the type of printing medium is prevented from becoming too difficult to be extracted. In addition, the above-described learning ranges are used, and if measured values fall outside the learning ranges, extraction ranges are prevented from being extended. In the present exemplary embodiment, the description will be given assuming that a learning range is set as a range that is not to be changed. As another configuration, the size of the learning range may also be changed in accordance with the extension and reduction of a detection range.

Figure 16:
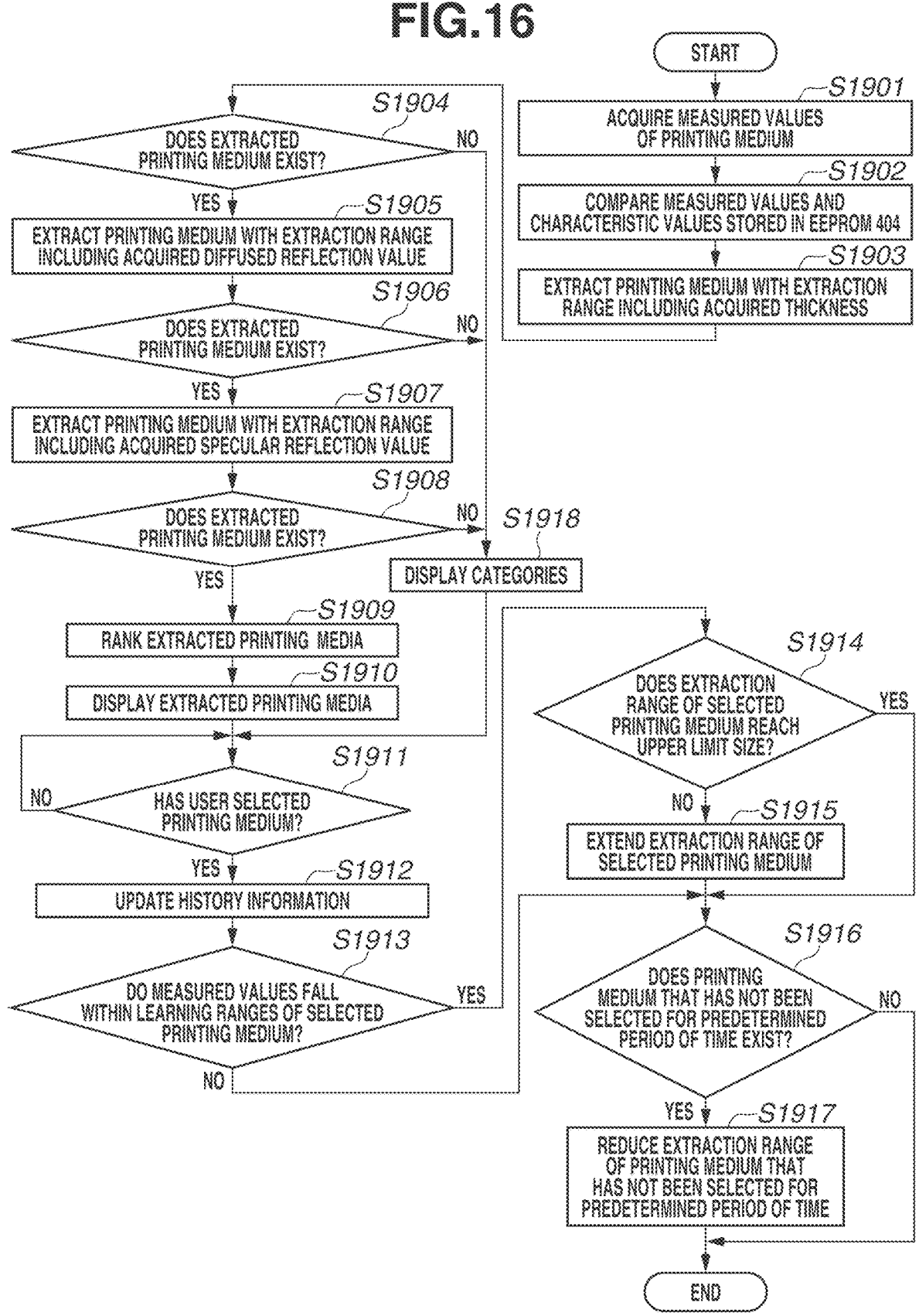
FIG. 16 is a flowchart illustrating printing medium determination processing according to an exemplary embodiment.

FIG. 16 is a flowchart illustrating printing medium determination processing according to the present exemplary embodiment. In steps S1901 to S1911 and S1918 in FIG. 16, processing similar to the processing in steps S101 to S111 and S114 in FIG. 5 is performed. Step S1910 corresponds to step S110 in FIG. 5, and in step S1910, the CPU 401 notifies names of types of printing media to the input-output unit 406 in the order ranked in step S1909. The names of types of printing media may be notified in a history order as in step S210 in FIG. 13 in the second exemplary embodiment.

In step S1912, the CPU 401 updates history information in such a manner that the type of printing medium selected in step S1911 is regarded as the latest use history.

In step S1913, the CPU 401 determines whether the measured values acquired in step S1901 fall within learning ranges of the printing medium selected in step S1911. If all the measured values of a diffused reflection value, a specular reflection value, and a paper thickness fall within the learning ranges, it is determined that the measured values fall within the learning ranges of the selected printing medium. The learning range has a range twice as large as an extraction range set as an initial value, from the same middle value as the extraction range. Initial values of characteristic values of types of printing media are illustrated in FIG. 7A. The initial values refer to characteristic values of printing media that are prestored in the EEPROM 404 when the recording apparatus 100 is used by the user for the first time. The learning range is only required to be a range equal to or larger than an upper limit of an extendable range of an extraction range, and may be a range other than the range twice as large as the extraction range. If it is determined that the measured values do not fall within the learning ranges of the selected printing medium (NO in step S1913), the processing proceeds to step S1916. If it is determined that the measured values fall within the learning ranges of the selected printing medium (YES in step S1913), the processing proceeds to step S1914.

In step S1914, the CPU 401 determines whether an extraction range of a characteristic value of the selected type of printing medium reaches an upper limit extendable size. If it is determined that the extraction range does not reach the upper limit (NO in step S1914), the processing proceeds to step S1915. In step S1915, the CPU 401 extends the extraction range of the selected type of printing medium.

If it is determined that the extraction range reaches the upper limit (YES in step S1914), the processing proceeds to step S1916 without extending the range.

In step S1916, the CPU 401 determines whether a type that has not been selected for a predetermined period of time exists. If it is determined that the unselected type of printing medium exists (YES in step S1916), the processing proceeds to step S1917. In step S1917, the CPU 401 reduces an extraction range of the type of printing medium that has not been selected for the predetermined period of time or more. In the printing medium determination processing illustrated in FIG. 16, based on information regarding a history of types of printing media that is stored in the EEPROM 404, types of printing media stored as five types of printing media that have been lastly used are regarded as types of printing media that have been selected in the predetermined period of time. For example, in the case of history information as illustrated in FIG. 14, types of printing media from premium plain paper with a history order of 1 to standard glossy paper with a history order of 5 are types of printing media that have been selected in the predetermined period of time. In other words, in the above-described configuration, the predetermined period of time can also be said as a period of time in which the user inputs a printing medium to be used five times. The predetermined period of time may be set based on a time from when each type of printing medium has been lastly used, aside from a history order. If it is determined that a type of printing medium that has not been selected for the predetermined period of time does not exist (NO in step S1916), the processing ends. If it is determined that a type of printing medium that has not been selected for the predetermined period of time exists (YES in step S1916), the processing proceeds to step S1917. In step S1917, the CPU 401 reduces the extraction range. When the CPU 401 reduces the extraction range in step S1917, a characteristic value stored in the EEPROM 404 as an initial value is set as a reducible lower limit, and the CPU 401 does not reduce the extraction range to a range narrower than the lower limit. If values are updated to values of the reduced extraction ranges, the processing ends. If the unselected type of printing medium does not exist (NO in step S1916), the processing ends.

<Extension and Reduction Methods of Range>

Hereinafter, the processing of extending an extraction range in step S1915, and the processing of reducing an extraction range in step S1917 will be described. Characteristic values of a printing medium that have been acquired in step S1901 are (specular reflection value, diffused reflection value, paper thickness)=(106, 98, 225). In this example, an extraction range can be extended up to a learning range serving as an upper limit.

FIG. 17A illustrates history information stored in the EEPROM 404 before the processing in FIG. 16 is performed. History information illustrated in FIGS. 17A and 17B is information in which, when a printing medium of the same type is selected a plurality of times among histories corresponding to six times, histories of the printing medium of the same type are stored a plurality of times. As in the history information illustrated in FIG. 14, history information in which, when a printing medium of the same type is used a plurality of times, only lastly-used information is stored as a history may be used. FIG. 18A illustrates characteristic values of printing media that are stored in the EEPROM 404 before the processing in FIG. 16 is performed. The types of printing media with characteristic values updated from initial values of characteristic values illustrated in FIG. 7A are standard half glossy paper, thick glossy paper, and premium plain paper.

A printing medium desired by the user to be selected is standard glossy paper. Nevertheless, because the measured value of a specular reflection value does not fall within an extraction range of standard glossy paper illustrated in FIG. 18A, standard glossy paper is not extracted as a candidate printing medium, and in step S1910, the name of standard glossy paper is not displayed on the input-output unit 406. In step S1911, for selecting standard glossy paper, the user needs to select a category and select standard glossy paper.

Next, in step S1912, history information is updated. FIG. 17B illustrates history information obtained by updating the history information.

In step S1913, it is determined whether the measured values fall within the learning ranges of standard glossy paper. Because the measured values of all characteristic values fall within the learning ranges twice as large as the extraction ranges of characteristic values (YES in step S1913), the processing proceeds to step S1914.

Because it is determined in step S1914 that an extraction range of standard glossy paper does not reach an upper limit range (NO in step S1914), the processing proceeds to step S1915. In step S1915, the extraction range is extended. FIG. 18B illustrates references of types of used printing media with updated characteristic values. Among characteristic values illustrated in FIG. 18B, characteristic values of standard glossy paper and thick glossy paper are updated from the characteristic values illustrated in FIG. 18A. In the present exemplary embodiment, a range stored in the EEPROM 404 as a reference of a characteristic value is extended in such a manner that a distance from a reference value to a max value or a min value is extended by 20%. At this time, the min value and the max value are changed so as not to change the middle value of the range as represented by the following equations. The current max value and min value are a max value and a min value illustrated in FIG. 18A.

updated min value=current min value−(current max value−middle value)×0.2 updated max value=current max value+(current max value−middle value)×0.2

As illustrated in FIG. 18A, a current specular reflection value (before update) of standard glossy paper is a min value of 95 and a max value of 105. When the specular reflection value is set to fall within this range, standard glossy paper is not extracted.

updated min value: 95−(100−95)×0.2=94 updated max value: 105+(100−95)×0.2=106

In this manner, after the update, the min value of 94 and the max value of 106 are set. In a similar manner, a diffused reflection value and a paper thickness are also updated. As a result, after update, if a measured value is the same as the previous measured value, standard glossy paper is extracted.

By updating the extraction range in the above-described manner, even if a measured value does not fall within an extraction range in current printing medium determination processing and a printing medium is not extracted, the printing medium is extracted in the next printing medium determination processing, and displayed as a type of a candidate printing medium. This enhances the usability for the user.

In step S1916, a type of printing medium not included in the history information illustrated in FIG. 14 is regarded as a type of printing medium that has not been selected for the predetermined period of time. Because a type of printing medium not included in the history information illustrated in FIG. 17B exists (YES in step S1916), in step S1917, processing of reducing the extraction range is performed as represented by the following equations.

updated min value=current min value+(current max value−middle value)×0.2 updated max value=current max value−(current max value−middle value)×0.2

A range of characteristic values of thick glossy paper with characteristic values changed from initial values illustrated in FIG. 7A is reduced.

updated min value: 94+(106−100)×0.2=95.2 updated max value: 106−(106−100)×0.2=104.8

In the above calculation, the range becomes a range narrower than a lower limit range having the max value of 105 and the min value of 95. Thus, the values are updated to the min value of 95 and the max value of 105 serving as a lower limit. When a lower limit value is larger than the updated max value and a lower limit value is smaller than the updated min value, because the range is larger than a lower limit of the range, values are updated to the updated values.

The extension processing and the reduction processing of the range are performed as described above. In the above-described example, a range is changed at a predetermined rate but may be changed by a predetermined value. In this case, instead of providing an upper limit and a lower limit, the number of times a value is changed from an initial value may be restricted. A rate at which a range is changed may be varied for each characteristic, a range may be independently changed for each characteristic, or a range may be changed disproportionally toward a plus direction or a minus direction based on a measured value. An extraction range of a type of printing medium that has not been selected for the predetermined period of time may be returned to an initial value.

Moreover, as described in the printing medium determination processing illustrated in FIG. 5, a reference value of a characteristic value may be changed, and an extraction range may be further extended.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-083124, filed Apr. 24, 2019, which is hereby incorporated by reference herein in its entirety.

What is claimed is:

1. An information processing apparatus comprising:
an acquisition unit configured to acquire a measurement result obtained by measuring a characteristic of a printing medium on which recording is to be performed by a recording unit, and to acquire a characteristic reference range, which indicates a range of a value of characteristic of a printing medium, of each of types of printing media set in advance to identify a type of printing medium of which the characteristic has been measured;
a notification control unit configured to perform control to extract, based on the acquired measurement result and the acquired characteristic reference range, a type of a candidate printing medium which the characteristic reference range including the measurement result and to perform control to cause a notification unit to notify information indicating the type of the candidate printing medium;
an input unit configured to input information corresponding to a type of printing medium on which recording is to be performed by the recording unit, wherein the type of printing medium on which recording is to be performed has a first reference range which is the characteristic reference range corresponding to the information input by the input unit; and
an extension unit configured to extend the first reference range.

2. The information processing apparatus according to claim 1, further comprising a reduction unit configured to reduce a reference range,
wherein the acquisition unit acquires information regarding a history of a type of printing medium that has been input by the input unit, and
wherein the reduction unit reduces, based on the information regarding the history, the reference range of a type of printing medium that has not been used for a predetermined period of time.

3. The information processing apparatus according to claim 2, wherein the reduction unit reduces, to an initial range and based on the information regarding the history, the reference range of the type of printing medium that has not been used for the predetermined period of time.

4. The information processing apparatus according to claim 1, wherein, in a case where information corresponding to a predetermined type of printing medium is input a plurality of times by the input unit as a plurality of inputs and the extension unit extends the first reference range based on each of the plurality of inputs, extension rates of the first reference range in extensions are the same.

5. The information processing apparatus according to claim 1, wherein, based on the measurement result, the extension unit extends the first reference range such that a value near the measurement result among an upper limit value and a lower limit value defining the first reference range gets to a predetermined closeness to the measurement result.

6. The information processing apparatus according to claim 1,
wherein a learning range includes, and is larger than, the first reference range, and
wherein, in a case where the measurement result falls within the learning range of the type of printing medium corresponding to the information input by the input unit, the extension unit extends the first reference range.

7. The information processing apparatus according to claim 6, wherein the extension unit does not extend the first reference range, to a range equal to or larger than a predetermined range.

8. The information processing apparatus according to claim 7, wherein the predetermined range is a range having a size larger than that of the first reference range and equal to or smaller than that of the learning range.

9. The information processing apparatus according to claim 6, wherein the learning range is not changed.

10. The information processing apparatus according to claim 1, further comprising:
the recording unit, wherein the recording unit is configured to perform recording on the printing medium on which recording is to be performed by applying a recording material; and
a conveyance unit configured to convey the printing medium on which recording is to be performed to a position at which recording is to be performed,
wherein, when the conveyance unit conveys the printing medium to a position at which the recording unit can perform recording, the recording unit performs recording onto the conveyed printing medium.

11. The information processing apparatus according to claim 10, further comprising a movable carriage equipped with the recording unit,
wherein a measurement unit is provided in the movable carriage and measures a characteristic of the printing medium conveyed by the conveyance unit to a position at which the measurement unit can perform measurement.

12. The information processing apparatus according to claim 1,
wherein, in a case where the acquisition unit acquires the measurement result after the extension unit extends the first reference range, the acquisition unit acquires a second reference range extended by the extension unit as an extended reference range, wherein the extracted type of the candidate printing medium is a first type of printing medium and the candidate printing medium is a first candidate printing medium, and wherein the notification control unit performs control to extract, as a second candidate printing medium and based on the measurement result and the extended reference range, a second type of printing medium using the characteristic reference range including the measurement result and performs control to cause the notification unit to notify information indicating a type of the second candidate printing medium.

13. The information processing apparatus according to claim 1, wherein the value of the characteristic of the printing medium includes a reflection value when light is emitted to the printing medium and reflected from the printing medium, and wherein the measurement result is a measured value when light is emitted to the printing medium and reflected from the printing medium.

14. A method for an information processing apparatus, the method comprising:

acquiring a measurement result obtained by measuring a characteristic of a printing medium on which recording is to be performed, and acquiring a characteristic reference range which indicates a range of a value of characteristic of a printing medium, of each of types of printing media set in advance to identify a type of printing medium of which the characteristic has been measured;

performing control to extract, based on the acquired measurement result and the acquired characteristic reference range, a type of a candidate printing medium usingwhich the characteristic reference range including the measurement result and performing control to notify information indicating the type of the candidate printing medium;

inputting information corresponding to a type of printing medium on which recording is to be performed, wherein the type of printing medium on which recording is to be performed has a first reference range which is the characteristic reference range corresponding to the input information; and extending the first reference range.

15. The method according to claim 14, further comprising:

reducing a reference range; and acquiring information regarding a history of a type of printing medium that has been input, wherein reducing includes reducing, based on the information regarding the history, the reference range of a type of printing medium that has not been used for a predetermined period of time.

16. The method according to claim 15, wherein reducing includes reducing, to an initial range and based on the information regarding the history, the reference range of the type of printing medium that has not been used for the predetermined period of time.

17. The method according to claim 14, wherein, based on the measurement result, extending includes extending the first reference range such that a value near the measurement result among an upper limit value and a lower limit value defining the first reference range gets to a predetermined closeness to the measurement result.

18. The method according to claim 14, wherein a learning range includes, and is larger than, the first reference range, and wherein, in a case where the measurement result falls within the learning range of the type of printing medium corresponding to the input information, extending includes extending the first reference range.

19. A non-transitory computer-readable storage medium storing a program to cause a computer to perform a method for an information processing apparatus, the method comprising:

acquiring a measurement result obtained by measuring a characteristic of a printing medium on which recording is to be performed, and acquiring a characteristic reference range which indicates a range of a value of characteristic of a printing medium, of each of types of printing media set in advance to identify a type of printing medium of which the characteristic has been measured;

performing control to extract, based on the acquired measurement result and the acquired characteristic reference range, a type of a candidate printing medium which the characteristic reference range including the measurement result and performing control to notify information indicating the type of the candidate printing medium;

inputting information corresponding to a type of printing medium on which recording is to be performed, wherein the type of printing medium on which recording is to be performed has a first reference range which is the characteristic reference range corresponding to the input information; and extending the first reference range.

20. The non-transitory computer-readable storage medium according to claim 19, the method further comprising:

reducing a reference range, and acquiring information regarding a history of a type of printing medium that has been input, wherein reducing includes reducing, based on the information regarding the history, the reference range of a type of printing medium that has not been used for a predetermined period of time.

21. The non-transitory computer-readable storage medium according to claim 19, wherein a learning range includes, and is larger than, the first reference range, and wherein, in a case where the measurement result falls within the learning range of the type of printing medium corresponding to the input information, extending includes extending the first reference range.

* * * * *